US012700338B2

(12) United States Patent
Kim et al.

(10) Patent No.: US 12,700,338 B2
(45) Date of Patent: Aug. 4, 2026

(54) DITHERING DEVICE

(71) Applicant: Samsung Electronics Co., Ltd.,
Suwon-si (KR)

(72) Inventors: Taehyun Kim, Suwon-si (KR);
Pureum Ryoo, Suwon-si (KR);
Junghyun Lim, Suwon-si (KR)

(73) Assignee: Samsung Electronics Co., Ltd.,
Gyeonggi-do (KR)

( * ) Notice: Subject to any disclaimer, the term of this
patent is extended or adjusted under 35
U.S.C. 154(b) by 213 days.

(21) Appl. No.: 18/442,433

(22) Filed: Feb. 15, 2024

(65) Prior Publication Data

US 2024/0386832 A1 Nov. 21, 2024

(30) Foreign Application Priority Data

May 19, 2023 (KR) ........................ 10-2023-0065159

(51) Int. Cl.
*G09G 3/20* (2006.01)
*G06F 7/58* (2006.01)

(52) U.S. Cl.
CPC ........... *G09G 3/2044* (2013.01); *G06F 7/588*
(2013.01); *G09G 3/2055* (2013.01); *G09G*
*2310/08* (2013.01)

(58) Field of Classification Search
CPC ............... G09G 3/2044; G09G 3/2055; G09G
2310/08; G06F 7/588
See application file for complete search history.

(56) References Cited

U.S. PATENT DOCUMENTS

| | | | |
|---|---|---|---|
| 6,219,838 B1 | 4/2001 | Cherichetti et al. |
| 8,325,387 B2 | 12/2012 | Lee et al. |
| 9,502,000 B2 | 11/2016 | Jeon et al. |
| 9,583,072 B2 | 2/2017 | Zhu |
| 10,121,404 B2 | 11/2018 | Lee et al. |
| 10,417,951 B2 | 9/2019 | Ando |
| 2008/0224976 A1 | 9/2008 | Lee et al. |
| 2009/0128584 A1 | 5/2009 | Lee et al. |

(Continued)

FOREIGN PATENT DOCUMENTS

| | | | |
|---|---|---|---|
| KR | 100855988 B1 * | 9/2008 | ............... G09G 3/36 |
| KR | 2013/0077044 A | 7/2013 | |

(Continued)

*Primary Examiner* — Said Broome
*Assistant Examiner* — Denis Vasiliy Minko
(74) *Attorney, Agent, or Firm* — Harness, Dickey &
Pierce, P.L.C.

(57) ABSTRACT

A dithering device configured to count a frame, a row, and
a column of input image data based on an enable signal and
generate count data, generate a plurality of random numbers
based on a first seed, store a first random number to a third
random number selected based on the count data, among the
plurality of random numbers, the first random number
corresponding to a frame period associated with the frame,
the second random number corresponding to a row period
associated with the row, and the third random number
corresponding to a column period associated with the col-
umn, generate a dithering mask for n-bit dithering (where n
is a positive integer) using a single random number, among
the first random number to the third random number, as a
second seed, and apply the dithering mask to the input image
data to perform the n-bit dithering.

17 Claims, 10 Drawing Sheets

1000

(56) References Cited

U.S. PATENT DOCUMENTS

| | | | | |
|---|---|---|---|---|
| 2011/0037762 A1* | 2/2011 | Elber | .................. | G06T 15/02 |
| | | | | 345/419 |
| 2016/0189596 A1* | 6/2016 | Kim | .................. | G09G 3/2055 |
| | | | | 345/99 |
| 2019/0385507 A1* | 12/2019 | Aiba | .................. | G09G 3/2055 |

FOREIGN PATENT DOCUMENTS

| | | | | | |
|---|---|---|---|---|---|
| KR | 20180077533 A | * | 7/2018 | .............. | G06N 3/04 |
| KR | 102068165 B1 | | 1/2020 | | |
| WO | WO-2022155889 A1 | * | 7/2022 | .............. | H04N 7/01 |

* cited by examiner

<Frame 0, Row 4>

<Frame 1, Row 0>

FIG. 10

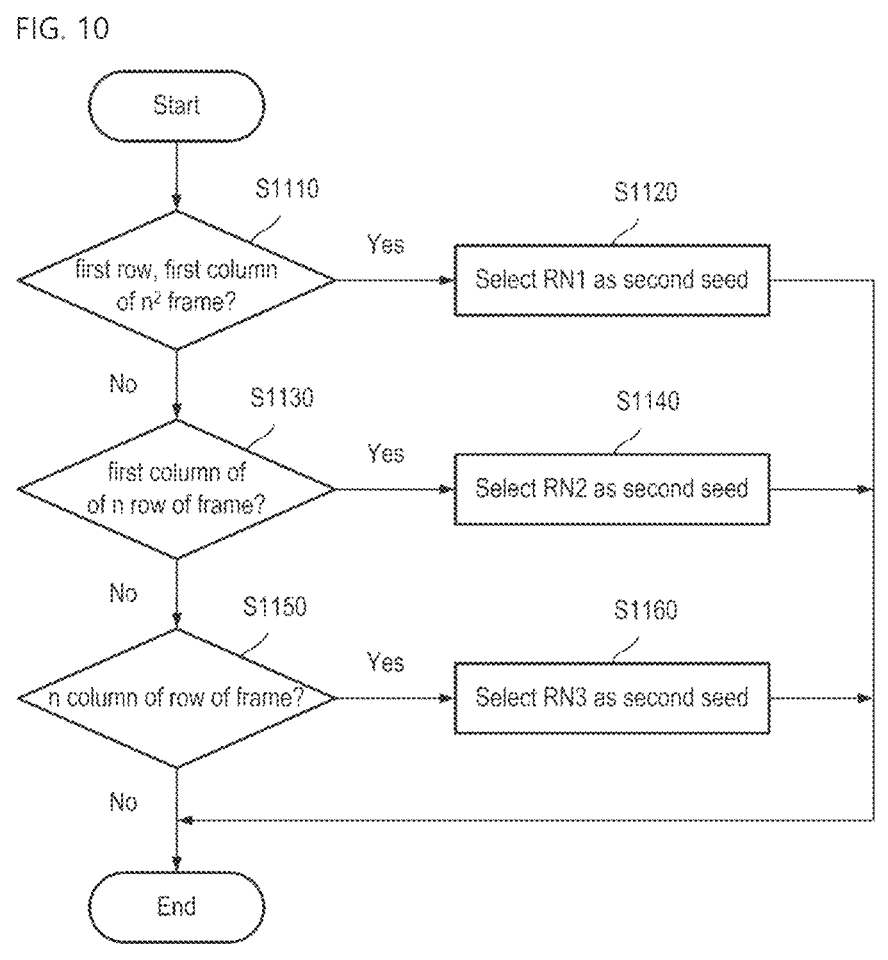

```
                    ┌─────────┐
                    │  Start  │
                    └─────────┘
                         │
                         ▼            S1110                    S1120
                    ╱─────────╲                         ┌──────────────────────────┐
            No     ╱ first row, first column ╲   Yes    │ Select RN1 as second seed │
        ◄─────────╱    of n² frame?          ╲─────────►└──────────────────────────┘
                    ╲                        ╱
                     ╲──────────────────────╱
                         │
                         │  No         S1130                    S1140
                         ▼                                 ┌──────────────────────────┐
                    ╱─────────╲                            │ Select RN2 as second seed │
                   ╱ first column of ╲          Yes        └──────────────────────────┘
                  ╱  of n row of frame? ╲─────────────────►
                   ╲                   ╱
                    ╲─────────────────╱
                         │
                         │  No         S1150                    S1160
                         ▼                                 ┌──────────────────────────┐
                    ╱─────────╲              Yes           │ Select RN3 as second seed │
                   ╱ n column of row of frame? ╲──────────►└──────────────────────────┘
                    ╲                        ╱
                     ╲──────────────────────╱
                         │
                         │  No
                         ▼
                    ┌─────────┐
                    │   End   │
                    └─────────┘
```

DITHERING DEVICE

CROSS-REFERENCE TO RELATED APPLICATION(S)

This U.S. non-provisional application claims priority under 35 USC § 119 to Korean Patent Application No. 10-2023-0065159, filed on May 19, 2023, in the Korean Intellectual Property Office, the contents of which are incorporated herein by reference in its entirety.

BACKGROUND

Example embodiments relate to a dithering device.

A display device may apply a picture quality enhancement algorithm to enhance picture quality. When a picture quality enhancement algorithm is applied, image data may exceed a bit-depth that may be output by a source driver. Accordingly, dithering for significantly reducing deterioration in picture quality is advantageous for image data exceeding a bit-depth.

SUMMARY

Example embodiments provide a dithering device for performing dithering while having an efficient storage space.

According to some example embodiments, a dithering device includes a controller activated based on an enable signal and configured to count a frame, a row, and a column of input image data and to generate count data, a random number generator operating based on a triggering signal of the controller and configured to generate a plurality of random numbers based on a first seed, a random number memory configured to store a first random number to a third random number selected based on the count data, among the plurality of random numbers, the first random number corresponding to a frame period associated with the frame, the second random number corresponding to a row period associated with the row, and the third random number corresponding to a column period associated with the column, a dithering mask generator configured to generate a dithering mask for n-bit dithering (where n is a positive integer) using a single random number, among the first random number to the third random number, as a second seed, and a dithering mask applier configured to apply the dithering mask to the input image data to perform the n-bit dithering.

According to some example embodiments, an operation method performed by a dithering device includes counting a frame, a row, and a column of input image data based on an enable signal and generating count data, generating a plurality of random numbers based on a first seed, storing a first random number to a third random number selected based on the count data, among the plurality of random numbers, the first random number corresponding to a frame period associated with the frame, the second random number corresponding to a row period associated with the row, and the third random number corresponding to a column period associated with the column, generating a dithering mask for n-bit dithering (where n is a positive integer) using a single random number, among the first random number to the third random number, as a second seed; and applying the dithering mask to the input image data to perform the n-bit dithering.

According to some example embodiments, a display system includes a plurality of dithering devices and a host processor configured to receive an interrupt signal from each of the plurality of dithering devices. Each of the plurality of dithering devices may be configured to count a frame, a row, and a column of input image data based on an enable signal and generate count data, generate a plurality of random numbers based on a first seed, store a first random number to a third random number selected based on the count data, among the plurality of random numbers, the first random number corresponding to a frame period associated with the frame, the second random number corresponding to a row period associated with the row, and the third random number corresponding to a column period associated with the column, generate a dithering mask for n-bit dithering (where n is a positive integer) using a single random number, among the first random number to the third random number, as a second seed, and apply the dithering mask to the input image data to perform the n-bit dithering. The host processor determines whether the first seeds overlap each other, based on the interrupt signal.

BRIEF DESCRIPTION OF DRAWINGS

The above and other aspects, features, and advantages of the inventive concepts will be more clearly understood from the following detailed description, taken in conjunction with the accompanying drawings.

FIG. 10 is a flowchart illustrating a method of selecting a second seed according to some example embodiments.

DETAILED DESCRIPTION

Figure 1:
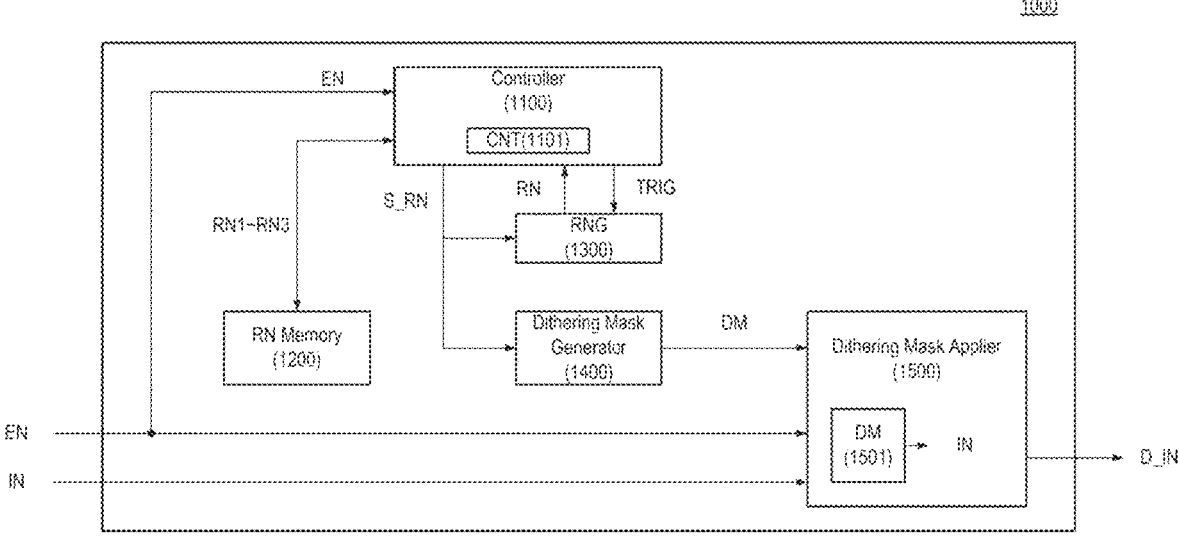
FIG. 1 is a diagram illustrating a dithering device according to some example embodiments.

Hereinafter, example embodiments will be described with reference to the accompanying drawings. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a diagram illustrating a dithering device according to some example embodiments.

Referring to FIG. 1, a dithering device 1000 according to some example embodiments may perform n-bit dithering (where n is a positive integer) on input image data IN. The input image data IN may be image data to be displayed on a display panel. The input image data IN may be, for example, image data generated and processed by a host device connected to the dithering device 1000.

The input image data IN may include a plurality of pieces of frame data. Each of the pieces of frame data may include a plurality of pieces of pixel data. Each of the pieces of pixel data may correspond to a single pixel included in the display panel. A pixel may include a plurality of sub-pixels outputting lights of different colors. For example, each of the pieces of pixel data may include a plurality of pieces of sub-pixel data. Each of the pieces of pixel data may correspond to a first line (for example, a row) and a second line (for example, a column) of the display panel.

In some example embodiments, when a screen having a high bit-depth is output to an output device (for example, a display panel) having a low bit-depth, data in a portion exceeding a bit-depth, which can be output by the output device, may be lost. Dithering performed by the dithering device 1000 may be defined as an operation for temporally and/or spatially scattering lost data. For example, as a temporal (for example, frame domain) average and/or a spatial (for example, row and column) average of pre-dithered input image data IN and output data, for example, dithered input image data D_IN becomes the same, noise of an output screen may be reduced.

The dithering device 1000 according to some example embodiments may include a controller 1100, a random number memory 1200, a random number generator 1300, a dithering mask generator 1400, and a dithering mask applier 1500 to perform the above-mentioned dithering.

The controller 1100 may operate based on an enable signal EN. The controller 1100 may receive the enable signal EN from another device (for example, a host device, an image processing device, or the like) connected to the dithering device 1000, and may be activated based on the enable signal EN.

The controller 1100 may control the overall operation of the dithering device 1000.

In some example embodiments, the controller 1100 may count frames, rows, and columns of the input image data IN and may generate count data 1101. The count data 1101 may include a frame count for each frame, a row count for each row, and a column count for each column. The frame count may indicate which frame data pixel data, included in the input image data IN, corresponds to. The row count and column count indicate which row and column the pixel data corresponds to in each frame data, respectively. For example, when the frame count is Cf, the row count is Cr, and the column count is Cc (where Cf, Cr, and Cc are integers greater than or equal to 0), the pixel data may be disposed at a Cr-th row and a Cc-th column in Cf-th frame data.

In some example embodiments, the controller 1100 may apply a triggering signal TRIG to the random number generator (RNG) 1300.

In some example embodiments, the controller 1100 receives a plurality of random numbers RN generated by the random number generator 1300 based on the triggering signal TRIG and may select a random number corresponding to a specific time point, among the plurality of random numbers RN, based on the count data (CNT) 1101. For example, the controller 1100 may select first to third random numbers RN1 to RN3 based on the count data 1101. The controller 1100 may store the selected first to third random numbers RN1 to RN3 in the random number memory 1200. Alternatively, in some example embodiments, the controller 1100 may draw the first to third random numbers RN1 to RN3 stored in the random number (RN) memory 1200.

In some example embodiments, the first random number RN1 may be defined as a random number corresponding to a frame period associated with a frame. The frame period associated with the frame may correspond to, for example, every $n^2$ frame of the input image data IN. For example, the controller 1100 may select a random number corresponding to a frame period from among the plurality of random numbers RN, and may store the selected random number in the random number memory 1200 as the first random number RN1.

In some example embodiments, the second random number RN2 may be defined as a random number corresponding to a row period associated with a row. The row period associated with the row may correspond to, for example, every n rows of every frame of the input image data IN. For example, the controller 1100 may select a random number corresponding to a row period from among the plurality of random numbers RN, and may store the selected random number in the random number memory 1200 as the second random number RN2.

In some example embodiments, the third random number RN3 may be defined as a random number corresponding to a column period associated with a column. The column period associated with the column may correspond to, for example, every n columns of every row of every frame of the input image data IN. For example, the controller 1100 may select a random number corresponding to a column period from among the plurality of random numbers RN, and may store the selected random number in the random number memory 1200 as the third random number RN3.

The random number memory 1200 may store random numbers (for example, the first to third random numbers RN1 to RN3), selected by the controller 1100, from among the plurality of random numbers RN. The random number memory 1200 may store the first random number RN1 corresponding to the frame period, the second random number RN2 corresponding to the row period, and the third random number RN3 corresponding to the column period. In some example embodiments, the random number memory 1200 may store, as the first random number RN1, a random number at a time point at which a last frame ends within the frame period. In some example embodiments, the random number memory 1200 may store, as the second random number RN2, a random number at a time point at which a last row ends within the row period. In some example embodiments, the random number memory 1200 may store, as the third random number RN3, a random number at a time point at which a last column ends within the column period.

For example, the random number memory 1200 may include a volatile memory such as a dynamic random access memory (DRAM) or a static random access memory (SRAM), or a nonvolatile memory such a read-only memory (ROM), a flash memory, a resistive random access memory (ReRAM), or a magnetic random access memory (MRAM), but example embodiments are not limited thereto.

The random number generator 1300 may operate to generate a random number based on the triggering signal TRIG of the controller 1100. The random number generator 1300 may generate a plurality of random numbers RN to be used in the dithering mask generator 1400 based on a first seed. In some example embodiments, the first seed may be an initial value or a single random number S_RN selected from the first random number RN1 and the second random number RN2.

The plurality of random numbers RN generated by the random number generator 1300 may be used as a seed, for example, a second seed of the dithering mask generator 1400. The dithering mask generator 1400 may generate a random number based on the second seed, and the generated random numbers may be used as the dithering mask 1501.

In some example embodiments, the random number generator 1300 and the dithering mask generator 1400 may operate based on a pseudo random number generation algorithm. For example, the random number generator 1300 and the dithering mask generator 1400 may include a linear feedback shift register (LFSR), a lagged Fibonacci generator (LFG), a linear congruential generator (LCG), a Park-Miller generator, an inversive congruential generator (ICG), an add-with-carry (AWC) generator, a subtract-with-borrow (SWC) generator, a multiply-with-carry (MWC) generator, a complementary-multiply-with-carry (CMWC) generator, a Mersenne Twister (MT) generator, a Well Equidistributed Long-period Linear (WELL) generator, a Jenkin small fast-noncryptographic PRNG (JSF) generator, an advanced randomization system (ARS) generator, a permuted congruential generator (PCG), and a random cycle bit generator (RCB), but example embodiments are not limited thereto.

For example, the random number generator 1300 may operate to generate random numbers having relatively high entropy, compared with the dithering mask generator 1400. For example, the random number generator 1300 may generate a plurality of random numbers RN based on a pseudo random number generation algorithm having high uniformity (for example, WELL, or the like).

The dithering mask generator 1400 may generate a dithering mask (DM) 1501 for n-bit dithering using a single random number S_RN, selected from the controller from among the plurality of random numbers RN generated from the random number generator 1300, as the second seed. For example, the controller 1100 may read the first to third random numbers RN1 to RN3 stored in the random number memory 1200, and may select a single random number R_NS to be used as the second seed, among the first to third random numbers RN1 to RN3. The controller 1100 may transfer the selected random number S_RN to the dithering mask generator 1400. Thus, the dithering mask generator 1400 may generate the dithering mask 1501 using the selected random number S_RN as the second seed.

In some example embodiments, the dithering mask generator 1400 may generate the dithering mask 1501 by shuffling the single random number S_RN. For example, when generating the dithering mask 1501 based on the shuffling, the dithering mask generator 1400 should generate relatively more random numbers than the random number generator 1300. Accordingly, the dithering mask generator 1400 according to some example embodiments may generate the dithering mask 1501 based on a lightweight random number generation algorithm (for example, LFSR, or the like) having relatively low complexity compared with the random number generator 1300.

The dithering mask generator 1400 may transfer the generated dithering mask 1501 to the dithering mask applier 1500. The dithering mask applier 1500 may apply the dithering mask 1501 to the input image data IN to perform n-bit dithering, and may output the dithered input image data D_IN. For example, the dithering mask applier 1500 may truncate a portion corresponding to data exceeding a bit-depth that may be output from pixel data included in the input image data IN. Also, in some example embodiments, the dithering mask applier 1500 may compare the dithering mask 1501 and adjust remaining pieces of pixel data after truncation based on a result of the comparison.

According to some example embodiments, the dithering device 1000 may perform spatiotemporally uniform dithering in consideration of all frames, rows, and columns of the input image data IN, so that dithering noise may be significantly reduced. For example, random numbers for dithering may be generated through two stages (the random number generator 1300 and the dithering mask generator 1400), and a random number to be a seed (for example, a second seed) of the dithering mask generator 1400 may be stored for each specific time point, defined by a frame, a row, and a column, to save a storage space of random numbers.

Figure 2:
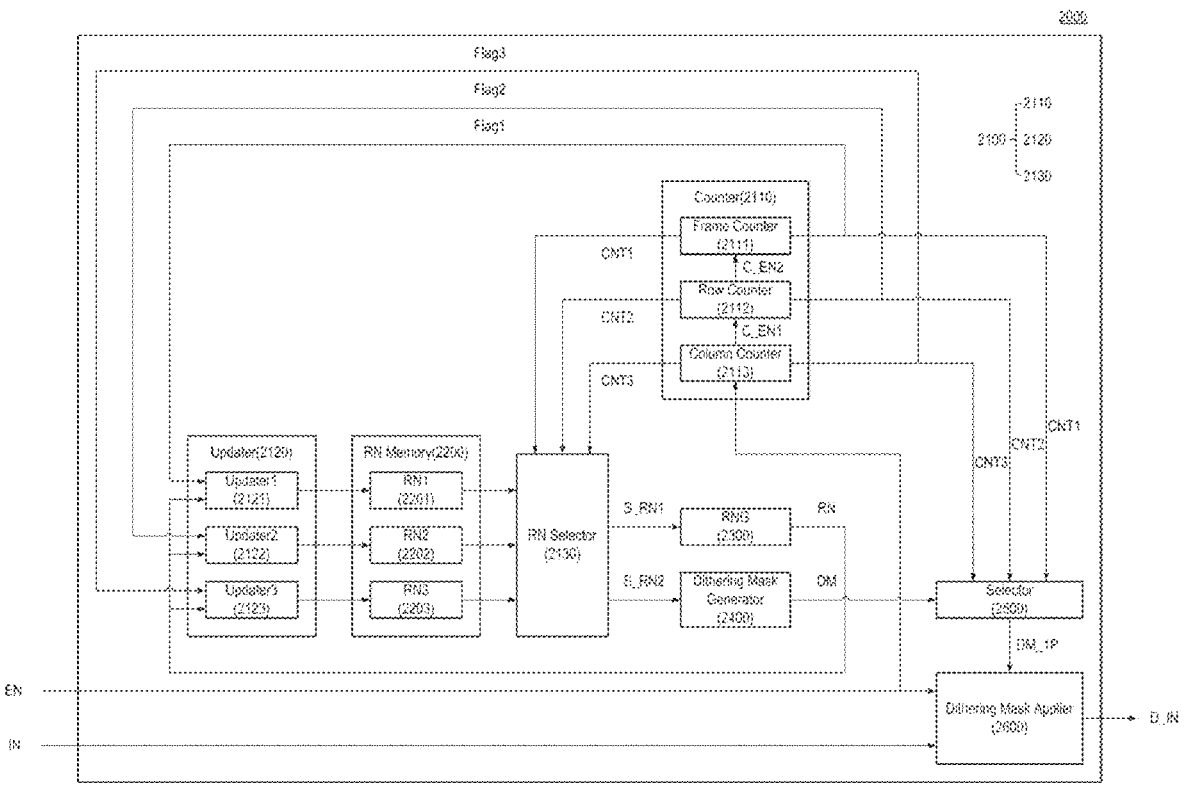
FIG. 2 is a diagram illustrating a dithering device according to some example embodiments.

FIG. 2 is a diagram illustrating a dithering device according to some example embodiments. Hereinafter, detailed descriptions regarding the overlapping parts with FIG. 1 will be omitted.

Referring to FIG. 2, a dithering device 2000 according to some example embodiments may include a controller 2100, a random number memory 2200, a random number generator 2300, a dithering mask generator 2400, a selector 2500, and a dithering mask applier 2600.

In some example embodiments, the controller 2100 may include a counter 2110, an updater 2120, and a random number selector 2130.

The counter 2110 may operate based on an enable signal EN.

The counter 2110 may include a frame counter 2111, a row counter 2112, and a column counter 2113, respectively counting frames, rows, and columns of the input image data IN. The frame counter 2111 may count frames whenever frame data of the input image data IN varies depending on a first counter enable signal C_EN1, for example, whenever a frame is changed. The row counter 2112 may count rows whenever each row of frame data is changed based on a second counter enable signal C_EN2. The column counter 2113 may count columns whenever each column in a row of frame data is changed.

The counter 2110 may generate count data on each frame, row, and column. The counter 2110 may transfer the generated count data to the random number selector 2130 and the selector 2500.

In some example embodiments, the counter 2110 may generate first to third flags Flag1 to Flag3 based on the generated count data, and may transfer the first to third flags Flag1 to Flag3 to the updater 2120. For example, the frame counter 2111 may generate and output the first flag signal Flag1 based on count data corresponding to a frame period. For example, the frame counter 2111 may generate and output the first flag signal Flag1 for each frame period.

In some example embodiments, the frame period may correspond to every $n^2$ frame of the input image data IN, and the frame counter 2111 may generate and output the first flag signal Flag1 for every $n^2$ frame.

In some example embodiments, the row period may correspond to every n rows of every frame of the input image data IN, and the row counter 2112 may generate and output the second flag signal Flag2 for every n rows.

In some example embodiments, the column period may correspond to every n columns of every row of every frame of the input image data IN, and the column counter 2113 may generate and output the third flag signal Flag3 for every n columns.

The updater 2120 may be configured to update a random number at a specific time point in the random number memory 2200. In some example embodiments, the updater 2120 may include a first updater 2121 to a third updater 2123.

The first updater 2121 may receive the first flag signal Flag1 from the frame counter 2111 and receive a plurality of random numbers from the random number generator 2300. The first updater 2121 may store a random number corresponding to the first flag signal Flag1, among the plurality of received random numbers, in the random number memory 2200. For example, the stored random number may be the first random number, as a random number generated by the random number generator 2300 at a first end point. The first end point may be, for example, a time point at which an arbitrary frame ends. Accordingly, the first random number 2201 updated by the first updater 2121 for each frame period may be maintained at an interval between frame periods, for example, $n^2$ frame periods.

In some example embodiments, the first end time may correspond to a count time of a last row and a last column of every $n^2-1$-th frame of the input image data IN.

The second updater 2122 may receive the second flag signal Flag2 from the row counter 2112 and receive a random number from the random number generator 2300. The second updater 2122 may store a random number corresponding to the second flag signal Flag2, among the plurality of received random numbers, in the random number memory 2200. For example, the stored random number may be the second random number 2202 as a random number generated by the random number generator 2300 at a second end point. The second end point may be, for example, a time point at which an arbitrary row ends. Accordingly, the second random number 2202 updated by the second updater 2122 for each row period may be maintained at an interval between row periods, for example, n row periods.

In some example embodiments, the second end point may correspond to a count time point of a last column of every $n-1$-th row of every frame of the input image data IN.

The third updater 2123 may receive the third flag signal Flag3 from the column counter 2113 and receive a random number from the random number generator 2300. The third updater 2123 may store a random number corresponding to the third flag signal Flag3, among the plurality of received random numbers, in the random number memory 2200. For example, the stored random number may be a third random number 2203 as a random number generated by the random number generator 2300 at a third end point. The third end point may be, for example, a time point at which an arbitrary column ends. Accordingly, the third random number 2203 updated by the third updater 2123 for each column period may be maintained at an interval between column periods, for example, n column periods.

In some example embodiments, the third end point may correspond to a count time point of every $n-1$-th column of every row of every frame of the input image data IN.

The random number memory 2200 may store an updated random number whenever a random number at a specific time point is updated by the updater 2120. For example, the random number memory 2200 may store a first random number RN1 2201 updated for each frame period from the first updater 2121, a second random number RN2 2202 updated for each row period from the second updater 2122, and a third random number RN3 2203 updated for each column period from the updater 2123.

The random number selector 2130 may select a single random number from among the first to third random numbers RN1 to RN3 stored in the random number memory 2200 based on the count data, and may transfer the selected single random number S_RN1 or S_RN2 to the random number generator 2300 and the dithering mask generator 2400. The random number selector 2130 may select a random number to be used for each of the random number generator 2300 and the dithering mask generator 2400.

The random number selector 2130 may receive first count data CNT1 from the frame counter 2111, receive second count data CNT2 from the row counter 2112, and receive third count data CNT3 from the column counter 2113. For example, the first count data CNT1, the second count data CNT2, and the third count data CNT3 may be count data on a frame, count data on a row, and count data on a column, respectively.

In some example embodiments, the random number selector 2130 may select the single random number S_RN1 to be a first seed of the random number generator 2300 from among the first random number 2201 and the second random number 2202, and may transfer the selected single random number to the random number generator 2300. For example, the random number generator 2300 may use one of the first random number 2201 and the second random number 2202 as the first seed. For example, the random number generator 2300 may select one of the first random number 2201 and the second random number 2201 and may transfer the selected random number to the random number generator 2300.

In some example embodiments, the random number selector 2130 may select the single random number S_RN2 to be the second seed of the dithering mask generator 2400 from among the first to third random numbers RN1 to RN3, and may transfer the selected random number to the dithering mask generator 2400. The single random number to be used as the second seed may be selected based on a fame, a row, and a column to be dithered.

The random number generator 2300 may generate a plurality of random numbers RN using an initial value or the selected singe random number as the first seed. The plurality of random numbers RN generated by the random number generator 2300 may be transmitted to the updater 2120, and the updater 2120 may update random numbers corresponding to the first to third flags Flag1 to Flag3, among the plurality of random numbers RN, to first to third random numbers RN1 to RN3 according to some example embodiments.

The dithering mask generator 2400 may generate a dithering mask DM using a single random number selected from among the first to third random numbers RN1 to RN3 as the second seed. The generated dithering mask DM may have various sizes depending on a size of dithering (for example, n bits). For example, $n^2$ dithering masks DM may be generated. Each dithering mask included in a plurality of dithering masks DM may correspond to a single pixel, among a plurality of pixels included in a dithering window in which dithering is performed.

In some example embodiments, a single random number selected from the random number selector 2130, for example, the second seed, may be the first random number 2201 in a first row and a first column of every $n^2$-th frame of the input image data IN. In some example embodiments, the second seed may be the second random number 2202 in a first column of every n rows of every frame of the input image data IN. In some example embodiments, the third seed may be a third random number 2203 in every n-th column of every row of every frame of the input image data IN.

Accordingly, in some example embodiments, the dithering mask generator 2400 may generate a dithering mask DM using the first random number 2201 as a second seed in a first row and a first column of every $n^2$-th frame of the input image data IN, generate a dithering mask DM is generated using the second random number 2202 as a second seed in a first column of every n rows of every frame, and generate a dithering mask DM using the third random number 2203 as a third seed in every n-th column of every row of every frame.

The selector 2500 may select a single dithering mask DM_1P from among a plurality of dithering masks DMs based on the count data, and may transfer the single dithering mask DM_1P to the dithering mask applier 2600. The count data may be present for each frame, row, and column period. Accordingly, in some example embodiments, the selector 2500 may select a single dithering mask DM_1P to be applied to pixel data corresponding to a frame, a row, and a column at a specific time point when at least one of the frame, the row, and the column is changed, for example, when dithering is sequentially performed on a frame period, a row period, and a column period. The selector 2500 may transfer the selected single dithering mask DM_1P to the dithering mask applier 2600.

The dithering mask applier 2600 may apply a dithering mask to the input image data IN based on the single dithering mask DM_1P, and may output the dithered input image data D_IN. According to some example embodiments, the dithering device 2000 may store a random number to be a seed of the dithering mask generator 2400 at each specific time point defined by a frame, a row, and a column, and may select the stored random number at each specific time point, at which a dithering mask is to be generated, to generate the dithering mask. As a result, a storage space of the random number for generating the dithering mask may be saved.

Figure 3:
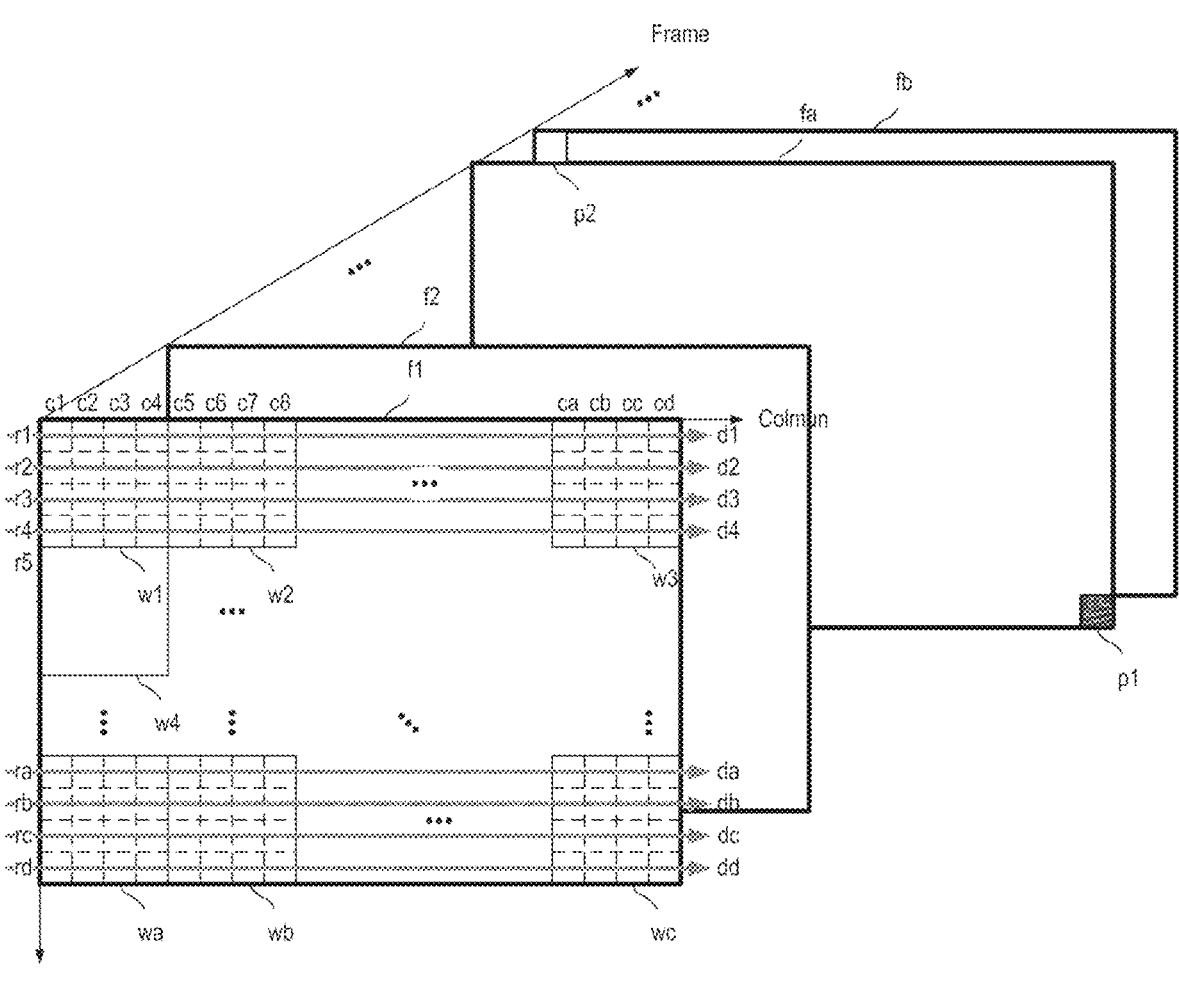
FIG. 3 is a diagram illustrating an operation of a dithering device according to some example embodiments.

FIG. 3 is a diagram illustrating an operation of a dithering device according to some example embodiments.

Referring to FIG. 3, a dithering device may perform dithering on input image data IN based on a dithering mask generated by a dithering mask generator. The input image data IN may be defined as a frame period, a row period, and a column period.

The input image data IN may include frame data defined as a frame period, and each frame data may include a plurality of pixels defined as row and column periods.

The dithering device may perform n-bit dithering based on a dithering window (or kernel). For example, the dithering window may have an n-by-n size. A dithering mask within the dithering window may be generated to have spatiotemporal uniformity. For example, a dithering mask within an n-by-n dithering window may have spatiotemporal uniformity during $n^2$ frames with respect to n-bit dithering. When the dithering mask does not have the uniformity, dithering noise may occur.

For example, when the dithering device performs 4-bit dithering, the dithering may be performed based on an operation of sequentially applying dithering windows having a 4-by-4 size within a single frame.

The dithering device may perform dithering on each row and each column of a frame f1.

For example, the dithering device may sequentially perform a dithering process on a column c1 to a column cd within a row r1 in a direction d1. The dithering device may generate a dithering mask for dithering. The dithering device may generate a dithering mask in a row r1 and a column c1 based on the first random number RN1, and may then generate a dithering mask when a dithering window changes, for example, for every n columns. For example, in a column c5 in which the dithering window w1 changes from a dithering window w1 to a dithering window w2, the dithering device may generate a dithering mask based on the third random number RN3.

In some example embodiments, when the dithering process in the direction d1 is completed, the dithering device may sequentially perform dithering processes in directions d2, d3, and d4. The dithering device may generate a dithering mask in a first column (the column c1) of each row based on the second random number RN2 whenever a row is changed. For example, the dithering device may generate a dithering mask based on the same second random number RN2 in a first column (the column c1) of each row (for example, a row r1 to a row r4) within at least the same dithering window. The dithering device may generate a dithering mask based on a third random number RN3 whenever the dithering window is changed again.

In some example embodiments, when dithering processes in directions d1 to d4 are completed, dithering processes on windows w1 to w3 may be completed. For example, a dithering process on n-by-n dithering windows having the same row block may be completed. Then, the dithering device may repeatedly perform the dithering process according to the above-described example embodiments again from an n-by-n dithering window (a dithering window wa) having a new row block. For example, the dithering device may generate a dithering mask starting from a row r5.

In some example embodiments, when the dithering widow switches to a dithering window having a new row block, for example, the dithering widow wa, the dithering device may generate a dithering mask based on the second random number RN2 updated in a row r5 and a column c1. Also, the dithering device may generate a dithering mask based on the third random number RN3 for every n columns.

The dithering device may generate a dithering mask in directions da to dd for dithering windows wa to wc included in a last row block of the frame f1.

The dithering device may generate a dithering mask based on one of the first to third random numbers RN1 to RN3 up to a frame fa, an $n^2-1$-th frame.

In some example embodiments, when a frame switches from the frame fa, the $n^2-1$-th frame, to a frame fb, an $n^2$-th frame, the dithering device may generate a dithering mask in a first pixel p2 of the frame fb based on the first random number RN1 updated in a last pixel p1 of the frame fa. For example, when the dithering device performs 4-bit dithering, the frame fa, the $n^2-1$-th frame, may be a fifteenth frame. In some example embodiments, when a dithering processing unit is switched to a sixteenth frame, a frame fb, the dithering device may generate a dithering mask based on a new first random number RN1 updated in a last pixel p1 of the fifteenth frame. For example, the first random number RN1 may be updated for every $n^2$ unit.

According to the above-described example embodiments, the dithering device may ultimately generate a dithering mask as much as the size of the dithering window. When generating random numbers based on shuffling according to the above-described example embodiment, the dithering device should operate the dithering mask generator as much as the size of the dithering window. Accordingly, the dithering device may generate a dithering mask based on a lightweight random number generation algorithm (for example, LFSR, or the like) having relatively low complexity.

The dithering device may select a single dithering mask corresponding to each pixel from the generated dithering masks, and may compare the single dithering mask with pixel data corresponding to each pixel.

In some example embodiments, the dithering device or the dithering mask applier of the dithering device may compare n bits (the same size as the dithering processing unit) of least significant bit (LSB) in the input image data IN with a single dithering mask corresponding to an LSB of a dithering mask. The dithering device or the dithering mask applier may truncate an LSB in the pixel data, and may increase or bypass the values of remaining pixel data by a predetermined value based on a result of the comparison.

For example, the dithering device or the dithering mask applier may increase the value of the remaining pixel data by +1 when the value of the pixel data is greater than a value of the dithering mask. For example, the dithering device or the dithering mask applier may bypass the remaining pixel data values when the value of the pixel data is smaller than the value of the dithering mask. The dithering device or the dithering mask applier of the dithering device may sequentially perform dithering processes in the dithering windows (from the dithering windows w1 to w3 to the dithering windows wa to wc) having the same row block in the directions d1 to d4 and directions da to dd.

The dithering device may perform dithering while repeating the above-described operation in the frame f1 to the frame fb.

FIGS. 4 to 8 are diagrams illustrating operations of dithering devices according to various example embodiments. As an example, FIGS. 4 to 8 illustrates operations of 4-bit dithering. For example, the dithering window may have a 4-by-4 size. However, this is only an example, and the dithering operations according to FIGS. 4 to 8 may be applied to n-bit dithering including 4 bits according to the above-described example embodiments. For example, the dithering operation of the dithering device may also be applied to 2 bits, 3 bits, or the like.

Figure 4:
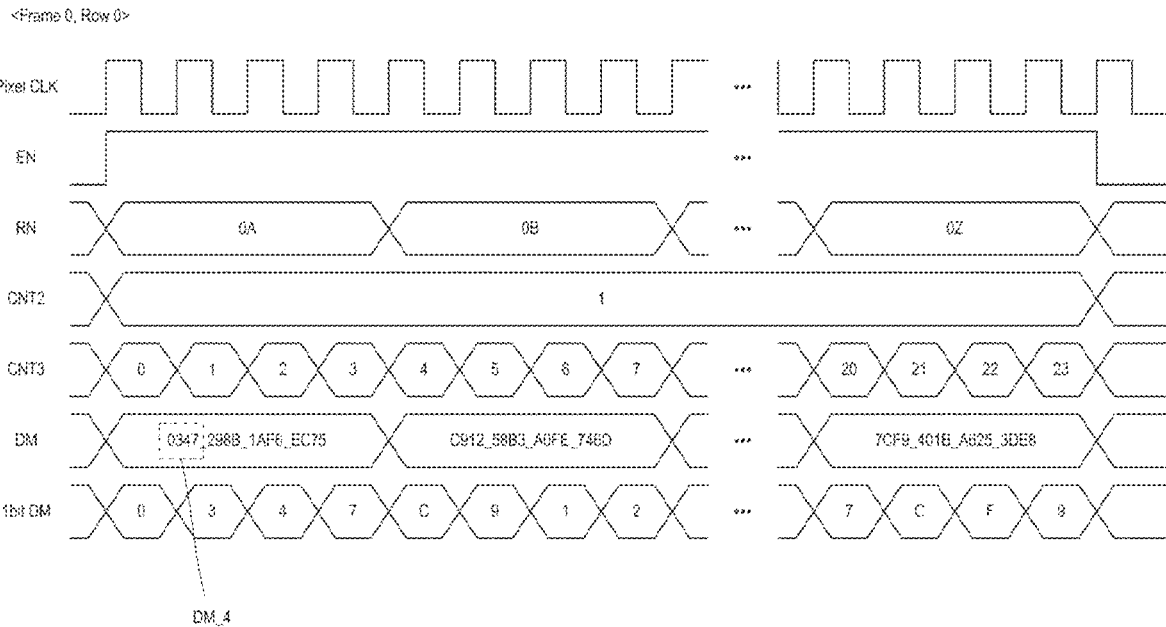
FIGS. 4 to 8 are diagrams illustrating operations of dithering devices according to some example embodiments.

Referring to FIG. 4, in some example embodiments, the dithering device may perform dithering on a first row Row 0 of a first frame Frame 0.

The pixel clock may indicate that a pixel is switched within the input image data IN. A single period of the pixel clock may correspond to a single pixel.

Second count data CNT2 may count the first row Row 0, and third count data CNT3 may count a column whenever the column is changed within the same row.

The dithering device may be activated when an enable signal EN becomes logic high. The first random number RN1 may have an initial value of "0A." Accordingly, the dithering device may output "0A" during zeroth to third columns, a column block of a single dithering window. Also, the dithering device generator may generate a dithering mask based on the first random number RN1. For example, of 4-bit dithering, 16 dithering masks may be generated.

The dithering mask may include four dithering masks, sequentially corresponding to each row included in the row block. For example, in the four dithering masks DM_4 corresponding to the first row Row 0, the dithering device or the selector may select a single dithering mask for each pixel corresponding to a single pixel clock.

The dithering device may output "0B" during fourth to seventh columns, a next column block. As the column block is changed, the dithering device may update and store "0B" as a third random number RN3 and the dithering device generator may generate a dithering mask based on "0B," the third random number RN3.

Then, for example, the dithering device may repeat the dithering according to the above-described example embodiments during the first row.

Figure 5:
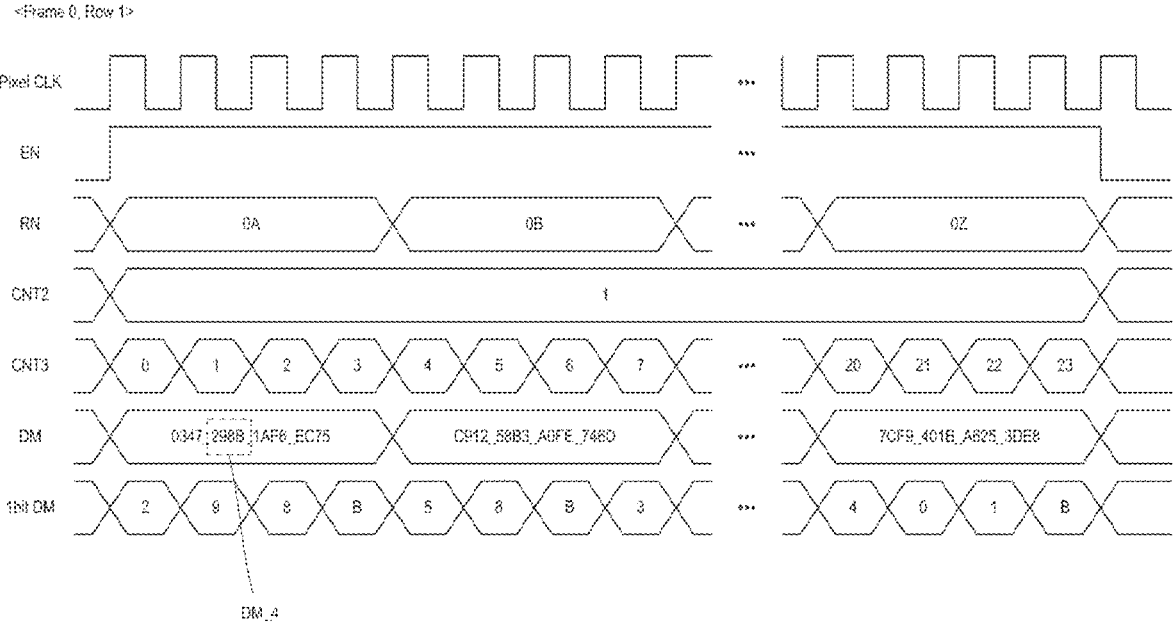

Referring to FIG. 5, in some example embodiments, the dithering device may perform dithering on a second row Row 1 of a first frame Frame 0.

The second count data CNT2 may count the second row Row 1, and the third count data CNT3 may count a column whenever the column is changed within the same row.

The dithering device may be activated when an enable signal EN becomes logic high.

The dithering device may generate random numbers "0A" to "0Z" whenever a column block is changed.

As the row is changed, in some example embodiments, the dithering device generator may generate a dithering mask based on the second random number RN2 in the first column of the changed row. The second random number RN2 may have an initial value of "0A." In some example embodiments, as the row is changed, the dithering device generator may select four dithering masks DM_4 corresponding to the changed row in the generated dithering mask. For example, the dithering device generator may select the four dithering masks DM_4 by shifting from a dithering mask, corresponding to a previous row, by n times in the generated dithering mask.

Then, in some example embodiments, the dithering device may generate a dithering mask based on the third random number RN3 updated whenever a column block is changed, select a single dithering mask corresponding to a single pixel clock in the four dithering masks DM_4 corresponding to the second row Row 1, and perform dithering based on the selected dithering mask.

The dithering device may repeat the dithering according to the above-described example embodiments during the second row, and may repeat dithering of a row period during a row block within a dithering window.

Figure 6:
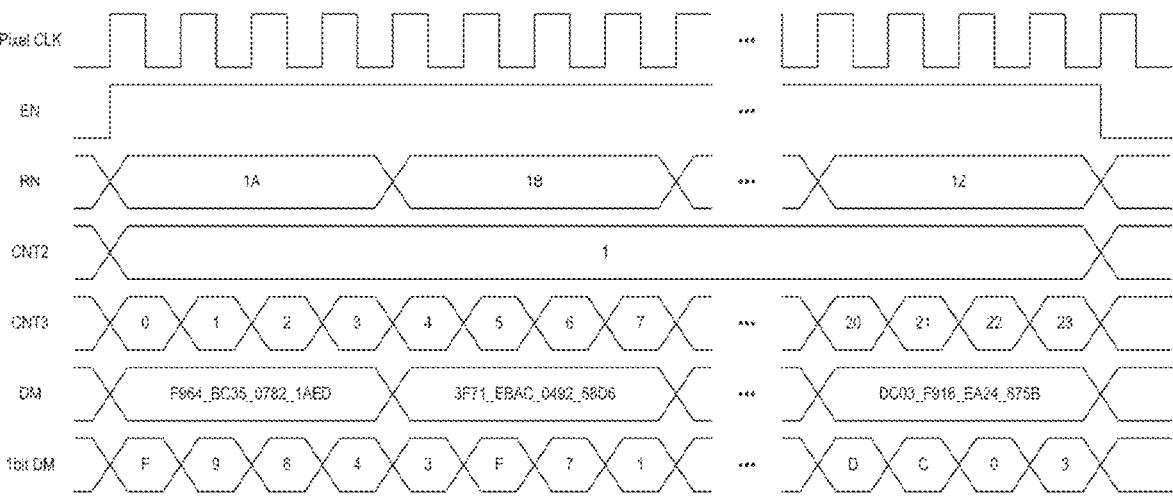

Referring to FIG. 6, in some example embodiments, the dithering device may perform dithering on a fifth row Row 4 of a first frame Frame 0. The fifth row Row 4 may mean that a row block of a dithering window is switched.

Second count data CNT2 may count the fifth row Row 4, and third count data CNT3 may count a column whenever the column is changed within the same row.

In some example embodiments, in a first column of a switched row (for example, an n+1-th row), the dithering device may update and store a random number, generated in a last column of a previous row (for example, an n-th row), as a second random number RN2. Accordingly, in some example embodiments, the dithering device generator may generate a dithering mask based on the second random number RN2 (for example, "0Z"). Also, the dithering device may generate random numbers "1A" to "1Z" using the second random number RN2 (for example, "0Z") as a new first seed.

Then, in some example embodiments, the dithering device may generate a dithering mask based on a third random number RN3 updated whenever a column block is changed, and may repeat performing dithering based on a single dithering mask corresponding to a single pixel.

In some example embodiments, the dithering device may repeat generating the dithering mask based on the second random number RN2 in a first column of a row changed whenever the row is changed.

In some example embodiments, the dithering device may update and store a random number, generated in a last column of a last row of a previous row in a first column of a row switched whenever a row block is changed, as the second random number RN2 and may repeat generating a dithering mask based on the updated second random number RN2.

Figure 7:
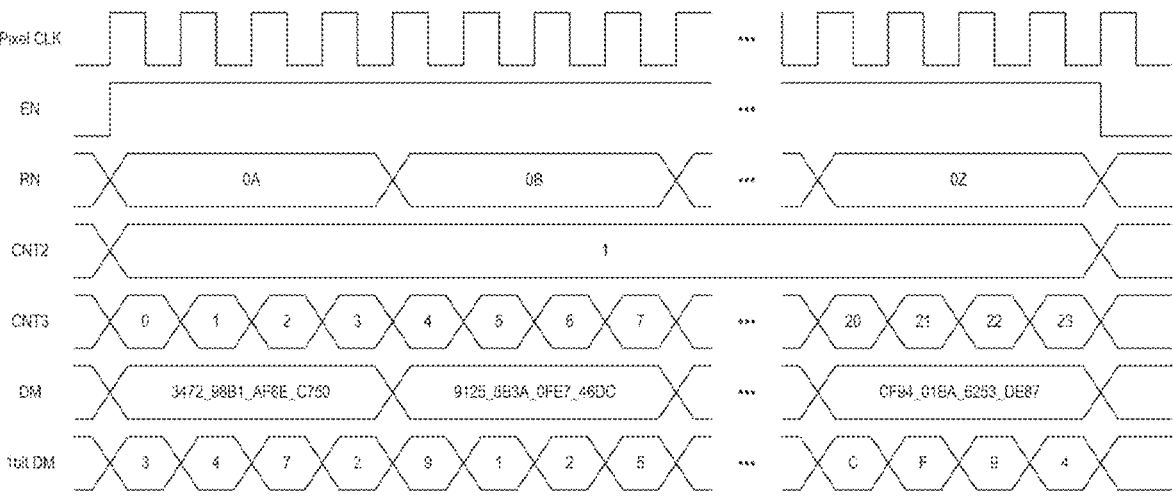

Referring to FIG. 7, in some example embodiments, the dithering device may perform dithering on a first row Row 0 of a second frame Frame 1.

As the frame is switched, the dithering device may generate a random number and a dithering mask based on a first random number RN1 ("0A") and may perform an operation of applying the dithering mask.

For example, the dithering device may perform shuffling according to various example embodiments to use the generated dithering mask in the shifted new frame. For example, the dithering device may generate a dithering mask 3472_98B1_AF6E_C750 by shifting a dithering mask 0347_298B_1AF6_EC75 for "0A" of FIG. 4 by one. A bit mask (0) corresponding to a most significant bit (MSB) may be shifted to a least significant bit (LSB). Alternatively, in some example embodiments, the dithering device may perform shuffling on each unit of at least one of a frame, a row, and a column.

Then, dithering operations of row and column periods are the same as described in the above-described example embodiments.

Figure 8:
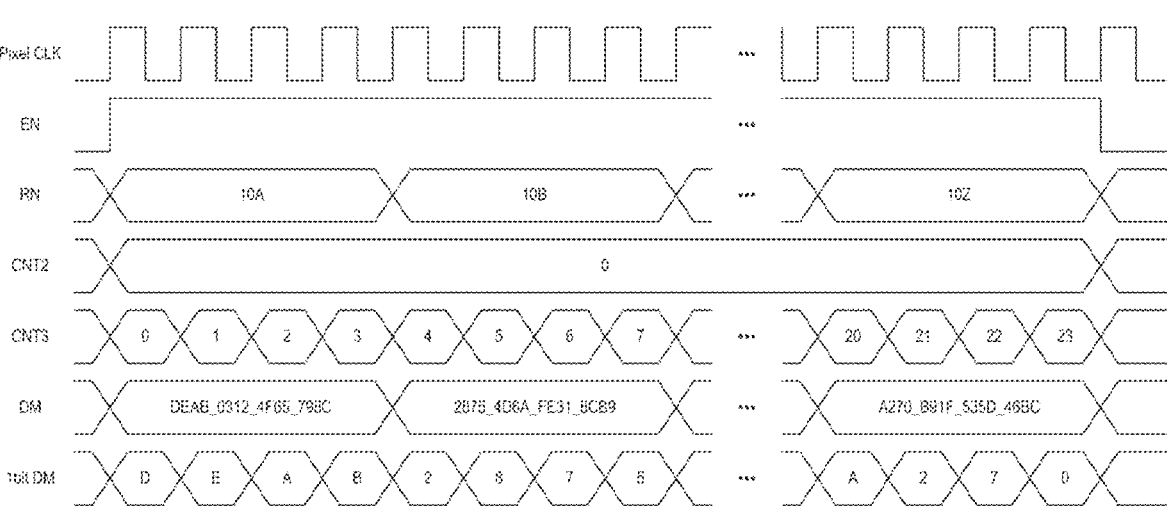

Referring to FIG. 8, in some example embodiments, the dithering device may perform dithering on a first row Row 0 of a seventeenth frame Frame 16. As a frame is shifted to the seventeenth frame Frame 16, for example, an $n^2$-th frame, the dithering device may update and store a first random number RN1, generated at a count time point (for example, a first end point) of a last row and a last column of an $n^2-1$-th frame, as the first random number RN1. The dithering device may generate a dithering mask based on the updated first random number RN1.

For example, it may be understood that the first random number RN1 is updated for every $n^2$ unit. Within $n^2$ units, the dithering device may generate a dithering mask using the same first random number RN1 when a frame is switched according to the above-described example embodiments. However, the first random number RN1 may be only shuffled and used according to various example embodiments. In some example embodiments, when the frame is switched in $n^2$ units, the dithering device may update the first random number RN1 and generate a dithering mask based on the updated first random number RN1.

Then, the dithering operation of the frame, row, and column periods may be the same as described in the above-described example embodiments.

In the above-described example embodiments, the dithering mask generator for generating the dithering mask may operate $n^2$ times per clock period for a single dithering window. Accordingly, the dithering mask generator may generate a dithering mask based on, in detail, a lightweight random number generation algorithm (for example, LFSR, or the like) having relatively low complexity compared with the random number generator.

According to the above-described example embodiments, random numbers generated by the dithering device (for example, a plurality of random numbers generated by the random number generator or a dithering mask generated by the dithering mask generator) may have the same sequence when they have the same seed. Accordingly, the dithering device may store random numbers at each specific time point and may read the stored random numbers to generate a dithering mask. As a result, the dithering device may efficiently generate random numbers in units of n-by-n blocks during $n^2$ frames.

Figure 9:
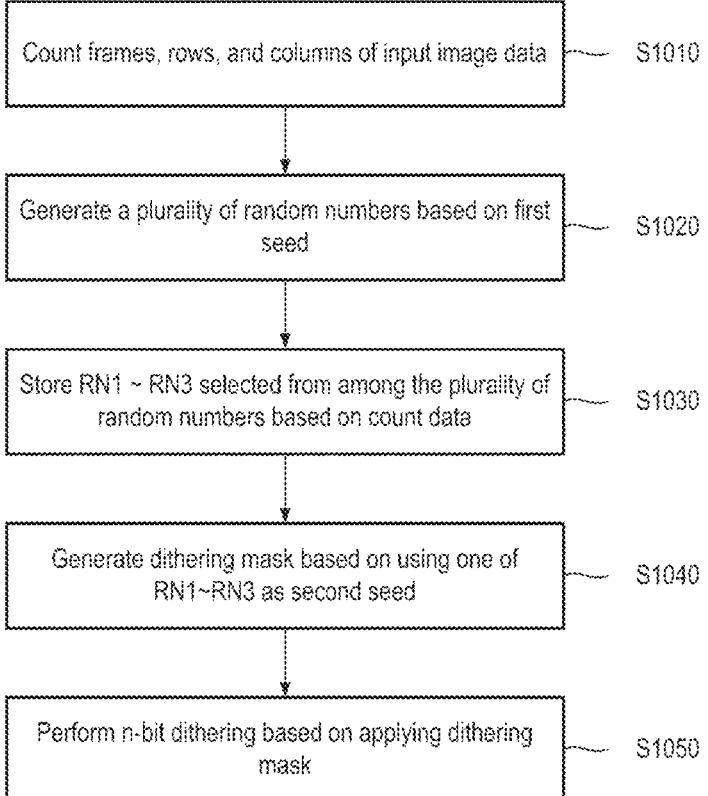
FIG. 9 is a flowchart illustrating an operation method of a dithering device according to some example embodiments.

FIG. 9 is a flowchart illustrating an operation method of a dithering device according to some example embodiments.

Referring to FIG. 9, in some example embodiments, in operation S1010, the dithering device may count frames, rows, and columns of input image data IN based on an enable signal and may generate count data.

In operation S1020, the dithering device may generate a plurality of random numbers based on a first seed. For example, when the dithering device performs n-bit dithering, the dithering device may generate a plurality of random numbers for each row in the same row block with respect to x n dithering windows, based on the same first seed. Alternatively, in some example embodiments, when a row block is switched, the dithering device may generate a plurality of random numbers based on a first seed, different from a first seed used in a previous row block.

In operation S1030, the dithering device may store first to third random numbers RN1 to RN3, selected based on the count data, among a plurality of random numbers. In some example embodiments, the first random number RN1 may be a random number corresponding to a frame period associated with a frame, the second random number RN2 may be a random number corresponding to a row period associated with a row, and the third random number RN3 may be a random number corresponding to a column period associated with a column.

In operation S1040, the dithering device may generate dithering masks for n-bit dithering using one of the first to third random numbers RN1 to RN3 as a second seed.

In operation S1050, the dithering device may perform n-bit dithering by applying the dithering mask to the input image data IN. For example, the dithering device may select a single dithering mask, corresponding to each pixel, from the dithering masks generated in operation S1040 and may compare the single dithering mask with the pixel data corresponding to each pixel. The dithering device may perform dithering by truncating n-bit LSB from the pixel data, comparing the LSB with the dithering mask, and bypassing or adjusting values of remaining pixel data based on a result of the comparison.

FIG. 10 is a flowchart illustrating a method of selecting a second seed according to some example embodiments.

Referring to FIG. 10, in operation S1110, the dithering device may determine whether pixels to be dithered are a first row and a first column of every $n^2$-th frame of input image data IN, based on count information.

In some example embodiments, when the pixels to be dithered are the first row and the first column of every $n^2$-th frame of the input image data IN, the flow proceeds to operation S1120 in which the dithering device may select the first random number RN1 as a second seed.

In some example embodiments, when the pixel to be dithered is not the first row and the first column of every $n^2$-th frame of the input image data IN, the flow proceeds to operation S1130 in which the dithering device identifies whether a pixel is a first column of every n rows of every frame of the input image data IN.

In some example embodiments, when the pixel is the first column of every n rows of every frame of the input image data IN, the flow proceeds to operation S1140 in which the dithering device may select a second random number RN2 as a second seed.

In some example embodiments, when the pixel is not the first column of every n rows of every frame of the input image data IN, the flow proceeds to operation S1150 in which the dithering device identifies whether the pixel is every n-th column of every row of every frame of the input image data IN.

In some example embodiments, when the pixel is every n-th column of every row of every frame of the input image data IN, the flow proceeds to operation S1160 in which the dithering device may select the third random number RN3 as the second seed.

According to the above-described operation method, in some example embodiments, the dithering mask may be generated by selecting one of the first to third random numbers RN1 to RN3 as the second seed at each specific time point defined for each of a frame, a row, and a column, rather than by generating a random number for each pixel. For example, the second seed is selected according to a frame period, a row period, and a column period defined based on a frame and a dithering window, so that the same sequence of random numbers may be generated in the same period. Accordingly, generation of random numbers for the second seed and dithering may be performed in units of dithering windows without using a large storage space.

Figure 11:
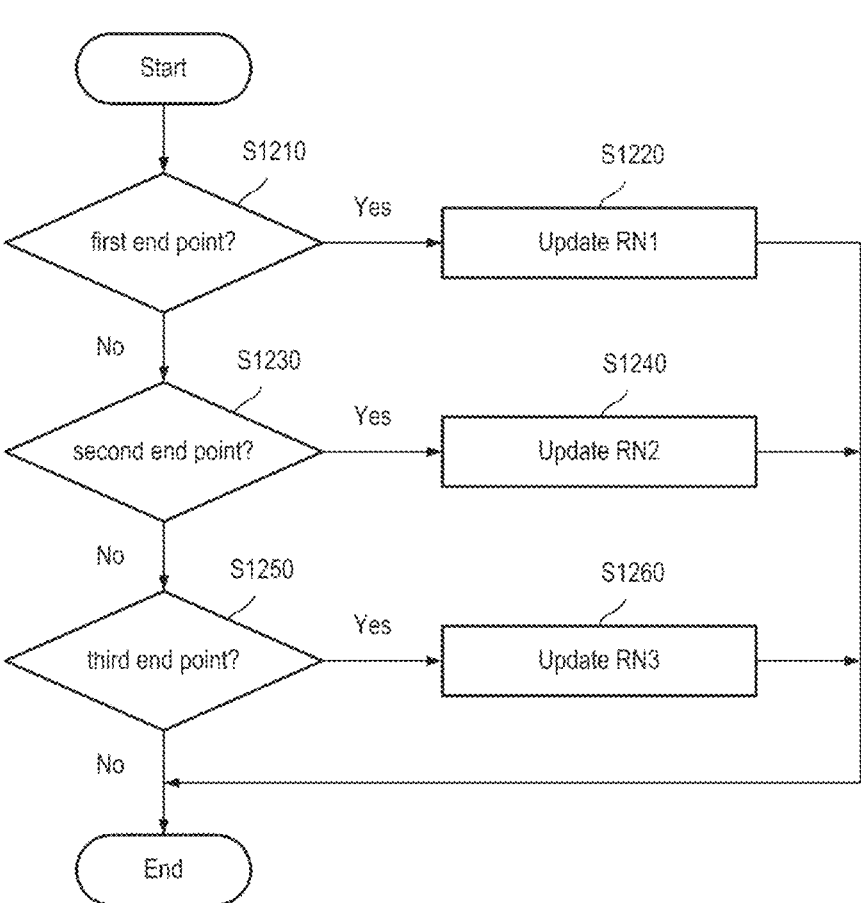
FIG. 11 is a flowchart illustrating an update method according to some example embodiments.

FIG. 11 is a flowchart of an update method according to some example embodiments.

Referring to FIG. 11, in operation S1210, the dithering device may determine whether a pixel to be dithered is a first end point, based on count information. For example, the first end point may correspond to a count time point of a last row and a last column of every $n^2-1$-th frame of input image data IN.

In some example embodiments, when the pixel corresponds to the first end point, the flow proceeds to operation S1220 in which the dithering device may update the first random number RN1 at each first end point.

In some example embodiments, when the pixel does not correspond to the first end point, the flow proceeds to operation S1230 in which the dithering device may determine whether the pixel to be dithered is a second end point, based on the count information. For example, the second end point may correspond to a count time point of a last column of every n−1-th row of every frame of the input image data IN.

In some example embodiments, when the pixel corresponds to the second end point, the flow proceeds to operation S1240 in which the dithering device may update the second random number RN2 at each second end point.

In some example embodiments, when the pixel does not correspond to the second end point, the flow proceeds to operation S1250 in which the dithering device may determine whether the pixel to be dithered is a third end point, based on the count information. For example, the third end point may correspond to a count time point of every n−1-th column of every row of every frame of the input image data IN.

In some example embodiments, when the pixel corresponds to the third end point, the flow proceeds to operation S1260 in which the dithering device may update the third random number RN3 at each third end point.

Figure 12:
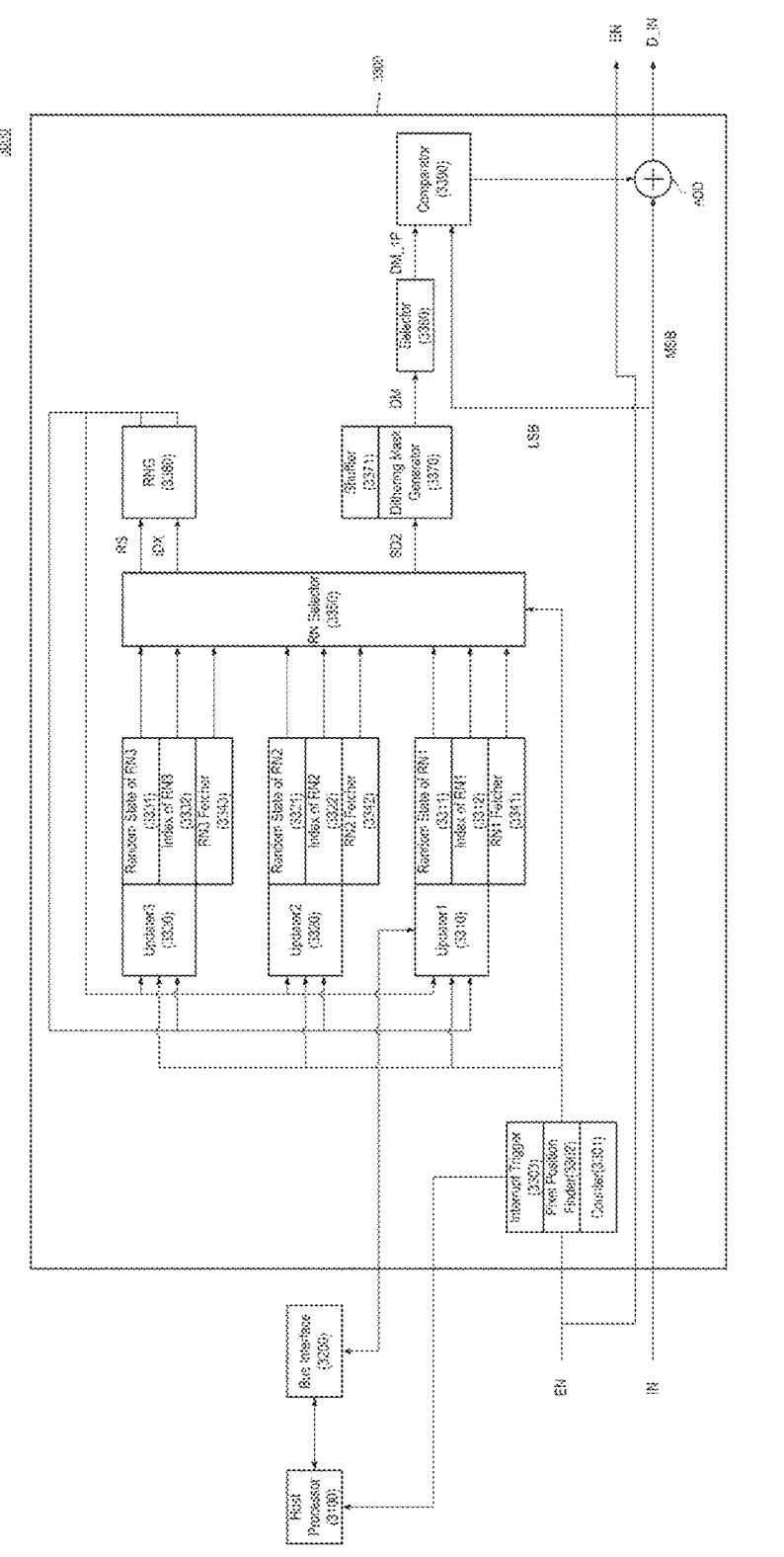
FIG. 12 is a diagram illustrating a display system according to some example embodiments.

FIG. 12 is a diagram illustrating a display system according to some example embodiments.

Referring to FIG. 12, a display system 3000 according to some example embodiments may include a host processor 3100, a bus interface 3200, and a dithering device 3300.

The host processor 3100 may be connected to a first updater 3310 through a bus interface 3200.

The host processor 3100 may control the overall operation of the display system 3000. For example, the host processor 3100 may include one or more of a central processing unit (CPU), a graphics processor unit (GPU), or an application processor (AP).

In some example embodiments, the host processor 3100 may be a central processing unit of an application processor or a microcontroller unit (MCU) of a timing controller TCON. The host processor 3100 may input random states and indices 3311, 3312, 3321, 3322, 3331, and 3332 for an initial value of RNG to a first updater 3310 through the bus interface 3200.

The dithering device 3300 may perform n-bit dithering. The dithering device 3300 may include a counter 3301, a pixel position finder 3302, an interrupt trigger 3303, first to third updaters 3310 to 3330, first to third fetchers 3341 to 3343, a random number selector 3350, a random number generator RNG 3360, a dithering mask generator 3370, a shuffler 3371, a selector 3380, a comparator 3390, and an adder ADD.

The counter 3301 may be activated based on an enable signal EN, and may count frames, rows, and columns from input image data IN.

The pixel position finder 3302 may find a position of a pixel to which a dithering process is applied, based on count information generated from the counter 3301.

The interrupt trigger 3303 may output an interrupt to the host processor 3100 when the random number generator 3360 operates. The host processor 3100 may monitor current random states and indices 3311, 3312, 3321, 3322, 3331, and 3332 whenever receiving the interrupt.

In some example embodiments, the host processor 3100 may monitor other dithering devices in addition to the dithering device 3300. The host processor 3100 may monitor the random states and the indices 3311, 3312, 3321, 3322, 3331, and 3332 while receiving interrupts from each dithering device, and may then determine whether random states and indices overlap between the dithering devices. In some example embodiments, when the random states and the indices overlap, the host processor 3100 may input different random states and/or difference indices to each of the dithering devices through the bus interface 3200 to avoid overlapping the first seed or the second seed SD2.

The first to third updaters 3310 to 3330 may respectively update the first to third random numbers RN1 to RN3 according to the above-described embodiments. The first random number RN1 may be updated as an initial value by the host processor 3100. Thus, for example, the random number generator 3360 may generate a plurality of random numbers based on the random state and the indices 3311, 3312, 3321, 3322, 3331, and 3332 for the initial value input through the host processor 3100.

Each of the first to third updaters 3310 to 3330 may transmit the random states and the indices 3311, 3312, 3321, 3322, 3331, and 3332 for each of the first to third random numbers RN1 to RN3 at each specific time point (for example, a first end point to a third end point).

The first to third fetchers 3341 to 3343 may output the first to third random numbers RN1 to RN3, updated through the first to third updaters 3310 to 3330, to the random number selector 3350, respectively.

The random number selector 3350 may select and transmit a random number to be used as a first seed of the random number generator 3360 or a random number to be used as a second seed SD2 of the dithering mask generator 3370 according to the above-described embodiments. For example, the random number selector 3350 may transfer a random state and an index RS and IDX of a specific random number to the random number generator 3360. The random number generator 3360 may generate a plurality of random numbers based on the random state and the index.

For example, the random number selector 3350 may select a single random number, among the first to third random numbers RN1 to RN3, for each specific frame period, row period, or column period, and may transmit the selected random number to the dithering mask generator 3370. The single random number may be used as the second seed SD2. The dithering mask generator 3370 may generate a random number using the single random number as the second seed SD2, and the shuffler 3371 may shuffle the generated random number to generate a dithering mask DM.

The selector 3380 may select a single dithering mask DM_1P, corresponding to a single pixel, from the generated dithering mask DM and may output the selected dithering mask DM_1P to the comparator 3390.

The comparator 3390 may receive LSB from the input image data IN and may perform dithering to compare the received LSB with a single dithering mask DM_1P. In this case, the received LSB may be LSB truncated from the input image data IN. The comparator 3390 may transmit the LSB, adjusted or bypassed based on a result of the comparison, to the adder ADD.

The adder ADD may combine adjusted or bypassed LSB and MSB to generate dithered input image data D_IN.

According to the above-described example embodiments, the host system may monitor a random state and an index, associated with the first seed of the random number generator 3360, through the host processor 3100 to avoid overlapping random states and indices between different dithering devices.

Figure 13:
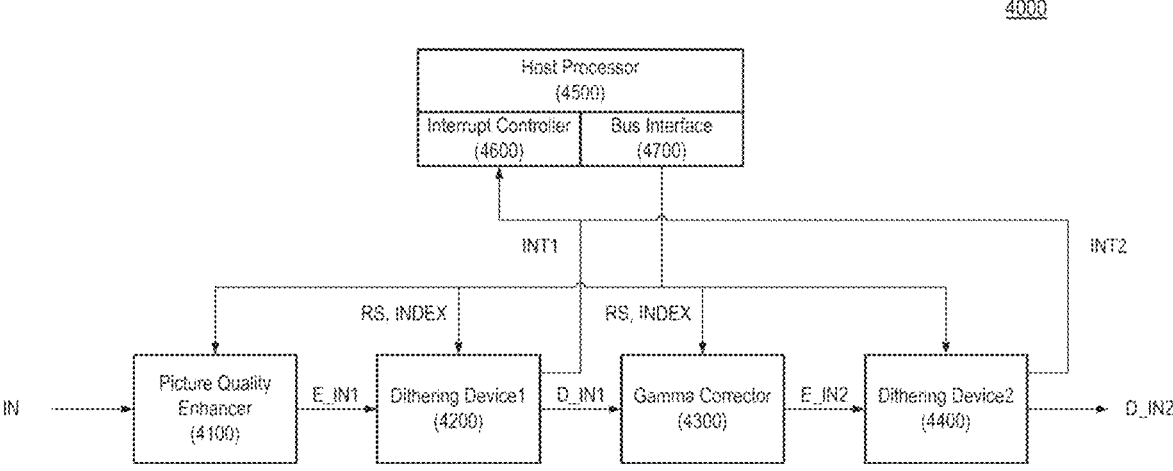
FIG. 13 is a diagram illustrating a display according to some example embodiments.

FIG. 13 is a diagram illustrating a display system according to some example embodiments.

Referring to FIG. 13, a display system 4000 may include a picture quality enhancer 4100, a first dithering device 4200, a gamma corrector 4300, a second dithering device 4400, a host processor 4500, and an interrupt controller 4600 and a bus interface 4700 connected to the host processor 4500.

In some example embodiments, the picture quality enhancer 4100 may sequentially receive input image data IN and quality (for example, a color, or the like)-corrected output input image data E_IN1 with to the first dithering device 4200. The first dithering device 4200 may dither the quality-corrected input image data E_IN1 according to the above-described example embodiments to output dithered input image data D_IN1 to the gamma corrector 4300. The gamma corrector 4300 may perform gamma correction on the dithered input image data D_IN1 to output gamma-corrected input image data E_IN2 to the second dithering device 4400. The second dithering device 4400 may dither the gamma-corrected input image data E_IN2 to output dithered input image data D_IN2.

In some example embodiments, the host processor 4500 may be connected to the picture quality enhancer 4100, the first dithering device 4200, the gamma corrector 4300, and the second dithering device 4400 through the bus interface 4700 to control the overall operation of the display system 4000. For example, the host processor 4500 may transfer an initial value and random states and indices RS and INDEX to each of the first dithering device 4200 and the second dithering device 4400 through the bus interface 4700, and the first dithering device 4200 and the second dithering device 4400 may perform dithering based on the received random states and indices RS and INDEX.

In some example embodiments, the host processor 4500 may receive a first interrupt INT1 from the first dithering device 4200 through the interrupt controller 4600 and receive a second interrupt INT2 from the second dithering device 4400 through the interrupt controller 4600. In some example embodiments, whenever receiving the first interrupt INT1 and the second interrupt INT2, the host processor 4500 may monitor the random states and indices RS and INDEX used as a seed of each of the first dithering device 4200 and the second dithering device 4400. For example, when the random states and indices RS and INDEX between the first dithering device 4200 and the second dithering device 4400 are overlapped, the host processor 4500 may change the random states and indices RS and INDEX for one of the dithering devices through the bus interface 4700.

Therefore, according to the above-described example embodiments, the host system may monitor seeds to be used for generation of random numbers based on interrupts received from different dithering devices, and may adjust overlapping between the seeds when the overlapping occurs.

Alternatively, in some example embodiments, the display system 4000 may be implemented as, for example, a timing controller TCON. The timing controller may be configured to receive input image data IN at a variable frame rate from another device such as the host processor 4500 and to provide data synchronized with the variable frame rate to a DDI (for example, a DDI of FIG. 14) through an intra-panel interface to support a variable frame mode in which an image is displayed at the variable frame rate.

In some example embodiments, when the display system 4000 is implemented as a timing controller, the input image data IN may be transmitted from, for example, a digital TV system on chip (DTV SoC) or a frame rate converter (FRC). For example, the display system 4000 may receive the input image data IN through a VByOne interface or a low-voltage differential signaling (LVDS) interface.

Figure 14:
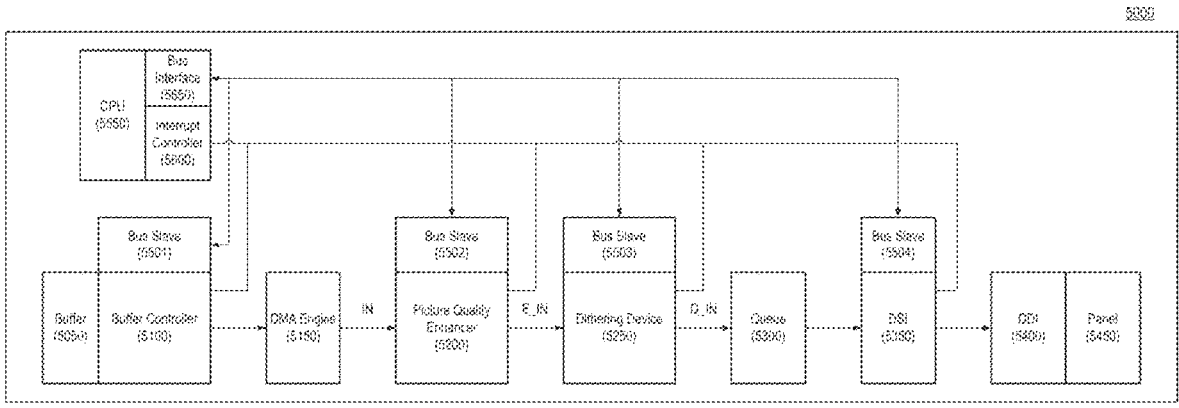
FIG. 14 is a diagram illustrating a processor according to some example embodiments.

FIG. 14 is a diagram illustrating a processor according to some example embodiments.

Referring to FIG. 14, a processor 5000 may be, for example, an application processor (AP). In some example embodiments, the processor 5000 may include a buffer 5050, a buffer controller 5100, a direct memory access (DMA) engine 5150, a picture quality enhancer 5200, a dithering device 5250, a queue 5300, a display serial interface (DSI) 5350, a display driver IC (DDI) 5400, a panel 5450, multiple bus slaves 5501 to 5504, a central processing unit (CPU) 5550, an interrupt controller 5600, and a bus interface 5650.

The buffer 5050 may be connected to the buffer controller 5100 to be controlled through the buffer controller 5100. The buffer 5050 may store input image data IN, and the buffer controller 5100 may read the stored input image data IN and transmit the read data to the DMA engine 5150. For example, the buffer 5050 may be implemented as a random access memory (RAM), a dynamic RAM (DRAM), or a static RAM (SRAM), but example embodiments are not limited thereto.

The DMA engine 5150 may fetch the input image data IN from the buffer 5050 rather than the outside of the processor 5000, and may transmit the fetched input image data IN to the picture quality enhancer 5200. The DMA engine 5150 may fetch the input image data IN without control or processing from the processor 5000 or a core.

The picture quality enhancer 5200 may generate corrected input image data E_IN from the input image data IN, and the dithering device 5250 may dither the corrected input image data E_IN according to a bit-depth of the DDI 5400 to generate dithered image data D_IN.

The dithered input image data D_IN may be stored in the queue 5300 and then transmitted to the DDI 5400 through the DSI 5350. The DDI 5400 may process the dithered input image data D_IN into output data, and the panel 5450 may display the output data. According to various examples, a bit-depth of the output data to be output through the DDI 5400 and a bit-depth of the corrected input image data E_IN may not match each other. However, when the corrected input image data E_IN is dithered through the dithering device 5250, an image may be output in spite of the bit-depth mismatch.

For example, output data output from the panel 5450 may have 1920×1080 pixels in full high definition (FHD) or 3840×2160 pixels in 4K ultra high definition (UHD). Each pixel may have 8 bits of resolution for each of R, G, and B, and thus may have 24 bits of resolution in total. For example, when the output data has a high resolution, it may be defined in terms of a resolution as well as a pixel.

For example, it may be difficult for the DDI 5400 to adjust and output a voltage to a specific bit or more. Nevertheless, the DDI 5400 may require more precise pixel processing (for example, high-resolution pixel processing in terms of resolution) to improve a manufacturing process or picture quality of the panel 5450. For example, when high dynamic range (HDR) is supported by the processor 5000, a range of pixels to be output by the DDI 5400 may be increased. Even in this case, more precise pixel processing may be required.

According to some example embodiments, input image data D_IN dithered by dithering corrected input image data E_IN through the dithering device 5250 according to a bit-depth of the DDI 5400 may be generated. Thus, the DDI 5400 may also output high-resolution data in terms of resolution.

The central processing unit 5550 may be connected to the buffer controller 5100, the picture quality enhancer 5200, the dithering device 5250, and the DSI 5350 through a plurality of bus slaves 5501 to 5504 connected to the bus interface 5650. For example, the CPU 5550 may receive an interrupt from the dithering device 5250 through a bus slave, and may monitor a random state and an index based on the interrupt.

Figure 15:
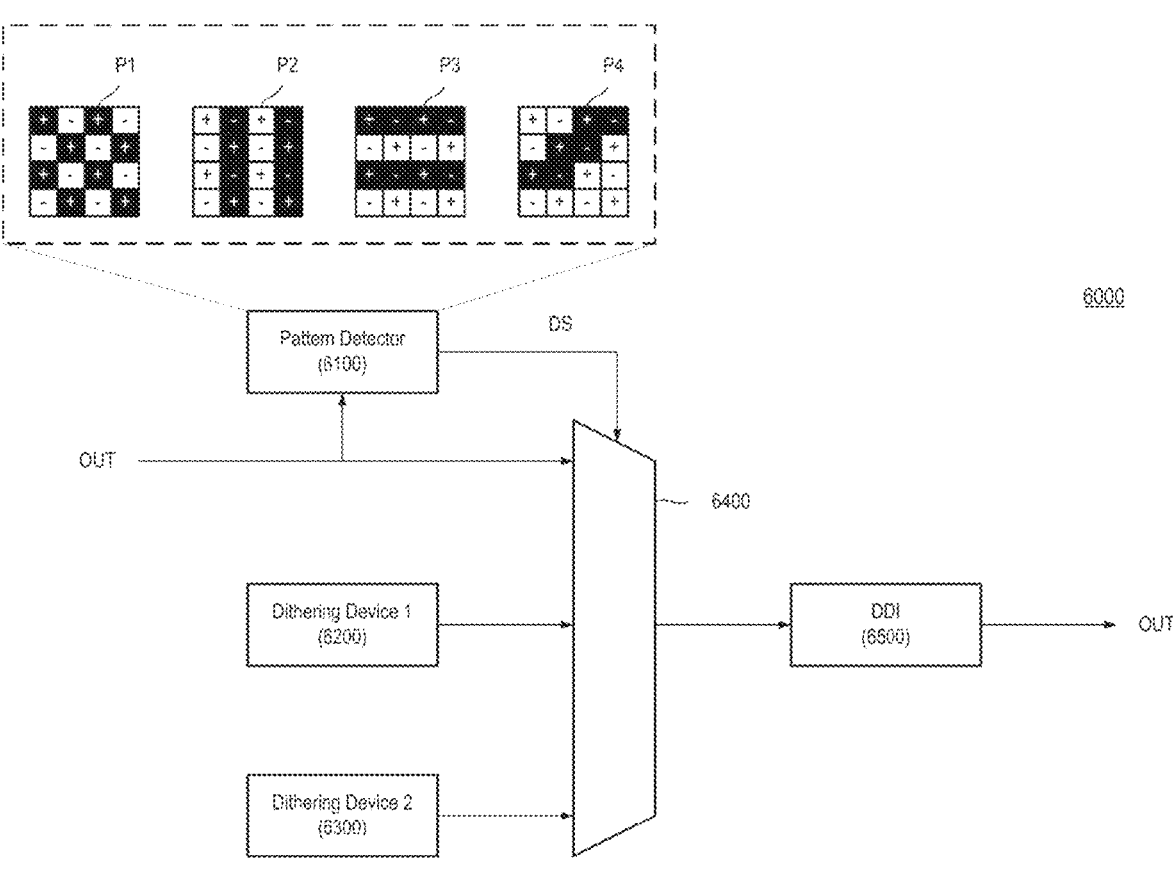
FIG. 15 is a diagram illustrating a display system according to some example embodiments.

FIG. 15 is a diagram illustrating a display system according to some example embodiments.

Referring to FIG. 15, a display system 6000 according to some example embodiments may include a pattern detector 6100, a first dithering device 6200, a second dithering device 6300, a multiplexer (MUX) 6400, and a DDI 6500.

The pattern detector 6100 may be configured to detect a specific pattern from output data OUT output from the DDI 6500. A specific pattern, e.g., a detection target, may be variously set according to some example embodiments. For example, a region corresponding to an image pattern may be set to have a shape such as P1 to P4 in a plurality of pixels included in the output data OUT, as illustrated in the drawing. For example, a specific pattern may be set to have a grating pattern such as P1, a line pattern including a plurality of consecutive pixels such as P2 or P3, a diagonal pattern including a plurality of consecutive pixels such as P4, or various other patterns.

In some example embodiments, when the output data OUT has a specific pattern and the panel 5450 of FIG. 14 is driven to be inverted to an anode or a cathode, noise such as flicker may occur during random number-based dithering.

The pattern detector 6100 may transmit a select signal DS for selecting one of the first dithering device 6200 and the second dithering device 6300 to the MUX 6400 depending on whether a specific pattern is detected. For example, a dither detector, e.g., the pattern detector 6100, may select the first dithering device 6200 when a specific pattern is detected and select the second dithering device 6300 when a specific pattern is not detected. Alternatively, the dithering detector, e.g., the pattern detector 6100, may not select both the first dithering device 6200 and the second dithering device 6300 when a specific pattern is detected. For example, the output data OUT may be directly transmitted to the DDI 6500 without being dithered.

The first dithering device 6200 and the second dithering device 6300 may perform dithering on the output data OUT based on different dithering operations.

In some example embodiments, the first dithering device 6200 may perform dithering based on ordered dithering. For example, ordered dithering may use a dithering pattern stored in a predetermined look-up table (LUT) rather than a random dithering pattern. The first dithering device 6200 may operate when a specific pattern is detected.

In some example embodiments, the second dithering device 6300 may perform dithering according to the above-described example embodiments. For example, the second dithering device 6300 may perform dithering according to a random dithering pattern based on a random number. The second dithering device 6300 may operate when a specific pattern is not detected.

The MUX 6400 may select one of the first dithering device 6200 and the second dithering device 6300 based on the select signal DS. Of the first dithering device 6200 and the second dithering device 6300, a selected one may perform dithering on the output data OUT.

According to the above-described example embodiments, dithering may be applied to be different depending on whether a specific pattern is detected. Thus, noise that may occur in output data may be reduced or prevented.

Figure 16:
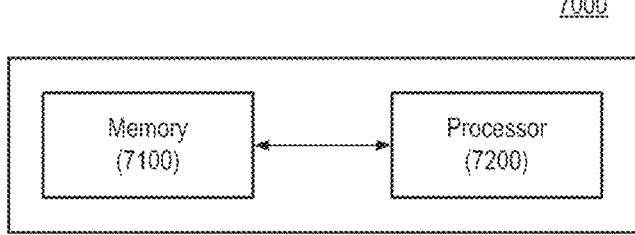
FIG. 16 is a diagram illustrating a dithering device according to some example embodiments.

FIG. 16 is a diagram illustrating a dithering device according to some example embodiments.

Referring to FIG. 16, a dithering device 7000 according to some example embodiments may include a memory 7100 and a processor 7200.

The memory 7100 may be connected to the processor 7200 and may store various types of information related to an operation of the processor 7200. For example, the memory 7100 may store a software code including at least one instruction for performing a portion or the entirety of the processes controlled by the processor 7220, or for performing description, functions, procedures, suggestions, methods, and/or operation flowcharts of the example embodiments.

The processor 7200 may be configured to control the memory 7100 and execute at least one instruction, stored in the memory 7100, to implement the description, functions, procedures, suggestions, methods, and/or operation flowcharts of the example embodiments. Also, in some example embodiments, the processor 7200 may provide operations according to various example embodiments based on the instructions stored in the memory 7100. Also, in some example embodiments, the processor 7200 may process the information, stored in the memory 7100, to generate data.

In some example embodiments, the processor 7200 may perform dithering based on an artificial intelligence (AI) model.

The AI model may be an AI model stored in the memory 7100. In some example embodiments, the AI model may be trained to select an image, most similar to an image before performing dithering, of input data using the image before performing dithering (for example, high-resolution data) as a truth or a label.

In some example embodiments, the processor 7200 may perform dithering according to the above-described example embodiments based on an image selected through an AI model. For example, the processor 7200 may generate a first seed or a second seed, used to generate a dithering mask, based on the selected image.

As set forth above, according to some example embodiments, a dithering device for performing dithering while having an efficient storage space may be provided.

As described herein, any devices, electronic devices, modules, models, units, and/or portions thereof according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules units, and/or portions thereof according to any of the example embodiments.

Further any of the machine learning models or elements described herein, may, for example, use various artificial neural network organizations and processing models, the artificial neural network organizations including, for example, a convolutional neural network (CNN), a deconvolutional neural network, a recurrent neural network optionally including a long short-term memory (LSTM) and/or a gated recurrent unit (GRU), a stacked neural network (SNN), a state-space dynamic neural network (SSDNN), a deep belief network (DBN), a generative adversarial network (GAN), and/or a restricted Boltzmann machine (RBM), and/or the like; and/or include linear and/or logistic regression, statistical clustering, Bayesian classification, decision trees, and/or the like.

While example embodiments have been shown and described above, it will be apparent to those skilled in the art that modifications and variations could be made without departing from the scope of the present inventive concepts as defined by the appended claims.

What is claimed is:

1. A dithering device comprising:
a controller activated based on an enable signal and configured to count a frame, a row, and a column of input image data and to generate count data;
a random number generator operating based on a triggering signal of the controller and configured to generate a plurality of random numbers based on a first seed;
a random number memory configured to store a first random number, a second random number, and a third random number selected based on the count data, among the plurality of random numbers, the first random number corresponding to a frame period associated with the frame, the second random number corresponding to a row period associated with the row, and the third random number corresponding to a column period associated with the column, the frame period corresponds to every first number of frame of the input image data, the row period corresponds to every second number of row of every frame of the input image data, and the column period corresponds to every third number of column of every row of every frame of the input image data;
a dithering mask generator configured to generate a dithering mask for n-bit dithering (where n is a positive integer) using a single random number, among the first random number, the second random number, and the third random number, as a second seed; and
a dithering mask applier configured to apply the dithering mask to the input image data to perform the n-bit dithering.

2. The dithering device of claim 1, wherein
the random number generator and the dithering mask generator operate based on a pseudo random number generation algorithm.

3. The dithering device of claim 1, wherein
the single random number is,
    the first random number in a first row and a first column of every $n^2$-th frame of the input image data,
    the second random number in a first column of every n row of every frame of the input image data, and
    the third random number in every n-th column of every row of every frame of the input image data.

4. The dithering device of claim 1, wherein
the dithering mask applier is configured to:
    compare n-bit least significant bit (LSB) of pixel data, corresponding to the count data, of the input image data with a single dithering mask, corresponding to the pixel data, of the dithering mask; and
    truncate the LSB from the pixel data, and increase a value of remaining pixel data by a predetermined value or bypass the value of the remaining pixel data based on a result of the comparison.

5. The dithering device of claim 4, further comprising:
a selector configured to select the single dithering mask based on the count data and to transfer the single dithering mask to the dithering mask applier.

6. The dithering device of claim 1, wherein
the dithering mask generator shuffles the single random number to generate the dithering mask.

7. The dithering device of claim 1, wherein
the controller further comprises a random number selector configured to select the single random number, among the first random number, the second random number, and the third random number, based on the count data and to transmit the single random number to the random number generator and the dithering mask generator.

8. The dithering device of claim 1, further comprising:

an updater connected to the random number memory and configured to update the first random number at each first end point, update the second random number at each second end point, and update the third random number at each third end point.

9. The dithering device of claim 8, wherein the first end point corresponds to a count time point of a last row and a last column of every $n^2-1$-th frame of the input image data, the second end point corresponds to a count time point of a last column of every n–1-th row of every frame of the input image data, and the third end point corresponds to a count time point of every n–1-th column of every row of every frame of the input image data.

10. An operation method performed by a dithering device, the method comprising:

counting a frame, a row, and a column of input image data based on an enable signal and generating count data;

generating a plurality of random numbers based on a first seed;

storing a first random number, a second random number, and a third random number selected based on the count data, among the plurality of random numbers, the first random number corresponding to a frame period associated with the frame, the second random number corresponding to a row period associated with the row, and the third random number corresponding to a column period associated with the column, the frame period corresponds to every first number of frame of the input image data, the row period corresponds to every second number of row of every frame of the input image data, and the column period corresponds to every third number of column of every row of every frame of the input image data;

generating a dithering mask for n-bit dithering (where n is a positive integer) using a single random number, among the first random number, the second random number, and the third random number, as a second seed; and applying the dithering mask to the input image data to perform the n-bit dithering.

11. The operation method of claim 10, further comprising:

selecting the first random number as the single random number in a first row and a first column of every $n^2$-th frame of the input image data;

selecting the second random number as the single random number in a first column of every n-th row of every frame of the input image data; and selecting the third random number as the single random number in every n-th column of every row of every frame of the input image data.

12. The operation method of claim 10, further comprising:

updating the first random number at each first end point;

updating the second random number at each second end point; and updating the third random number at each third end point.

13. The operation method of claim 12, wherein the first end point corresponds to a count time point of a last row and a last column of every $n^2-1$-th frame of the input image data, the second end point corresponds to a count time point of a last column of every n–1-th row of every frame of the input image data, and the third end point corresponds to a count time point of every n–1-th column of every row of every frame of the input image data.

14. A display system comprising:

a plurality of dithering devices; and a host processor configured to receive an interrupt signal from each of the plurality of dithering devices, wherein each of the plurality of dithering devices is configured to:

count a frame, a row, and a column of input image data based on an enable signal and generate count data;

generate a plurality of random numbers based on a first seed;

store a first random number, a second random number, and a third random number selected based on the count data, among the plurality of random numbers, the first random number corresponding to a frame period associated with the frame, the second random number corresponding to a row period associated with the row, and the third random number corresponding to a column period associated with the column, the frame period corresponds to every first number of frame of the input image data, the row period corresponds to every second number of row of every frame of the input image data, and the column period corresponds to every third number of column of every row of every frame of the input image data;

generate a dithering mask for n-bit dithering (where n is a positive integer) using a single random number, among the first random number, the second random number, and the third random number, as a second seed; and apply the dithering mask to the input image data to perform the n-bit dithering, and the host processor determines whether the first seeds overlap each other, based on the interrupt signal.

15. The display system of claim 14, wherein the host processor changes the first seed for one of the plurality of dithering devices when the first seeds overlap each other.

16. The display system of claim 14, wherein the single random number is, the first random number in a first row and a first column of every $n^2$-th frame of the input image data, the second random number in a first column of every n row of every frame of the input image data, and the third random number in every n-th column of every row of every frame of the input image data.

17. The display system of claim 14, wherein each of the plurality of dithering devices is configured to update the first random number at each first end point, update the second random number at each second end point, and update the third random number at each third end point.

* * * * *